(12) United States Patent
Lakshmanan et al.

(10) Patent No.: US 7,019,641 B1
(45) Date of Patent: Mar. 28, 2006

(54) HUMAN BEING PRESENCE DETECTION SYSTEM

(75) Inventors: Sridhar Lakshmanan, Belleville, MI (US); Bing Ma, Ann Arbor, MI (US)

(73) Assignee: M-Vision Inc., Belleville, MI (US)

( * ) Notice: Subject to any disclaimer, the term of this patent is extended or adjusted under 35 U.S.C. 154(b) by 142 days.

(21) Appl. No.: 10/799,401

(22) Filed: Mar. 12, 2004

Related U.S. Application Data

(60) Provisional application No. 60/454,296, filed on Mar. 13, 2003.

(51) Int. Cl.
*G08B 1/08* (2006.01)
(52) U.S. Cl. .................. 340/538; 340/438; 340/439; 701/45; 701/47
(58) Field of Classification Search ............... 340/538, 340/425.5, 438, 439, 457, 459, 460, 461; 701/45, 47
See application file for complete search history.

(56) References Cited

U.S. PATENT DOCUMENTS

| | | | |
|---|---|---|---|
| 6,431,592 B1 * | 8/2002 | Seip | 280/735 |
| 6,598,900 B1 * | 7/2003 | Stanley et al. | 280/735 |
| 6,697,723 B1 * | 2/2004 | Olsen et al. | 701/45 |
| 6,823,244 B1 * | 11/2004 | Breed | 701/29 |
| 6,950,022 B1 * | 9/2005 | Breed | 340/552 |

* cited by examiner

*Primary Examiner*—Daryl C Pope
(74) *Attorney, Agent, or Firm*—Rohm & Monsanto, PLC

(57) ABSTRACT

A human being presence detection system automatically determines the presence of human beings without directly attaching sensors to the human body and detects human drowsiness. The detection system characterizes the occupancy of a vehicle seat to determine the characteristics of deployment of vehicle airbags and restraints in the event of a crash/accident. In other applications, the presence of persons hiding in a predetermined space is detected, including caves, underground bunkers, tunnels, etc. The rescue of military personnel or of persons trapped under rubble, behind barriers, within building, etc., is facilitated. In one embodiment, human beings are detected using data obtained from pressure transducers in the space of interest. The pressure signals are processed by a novel signal processing algorithm to determine the presence or absence of a human being, using information from different types of pressure transducers. In addition, the system can identify other characteristics of a human being, such as whether a vehicle seat occupant is normally seated or leaning, once it is determined that a human being occupies the seat.

20 Claims, 5 Drawing Sheets

HUMAN BEING PRESENCE DETECTION SYSTEM

RELATIONSHIP TO OTHER APPLICATION

This application claims the benefit of U.S. Provisional Patent Application Ser. No. 60/454,296, filed Mar. 13, 2003.

BACKGROUND OF THE INVENTION

1. Field of the Invention

The invention relates generally to systems that detect the presence of a human being in a space of interest, and more particularly, to automatic detection of occupant status of a vehicle seat, i.e., whether the seat is occupied with a human being, or whether the seat is occupied with a non-human being (e.g., a box or a bag), or whether the seat is empty; determination when the seat is occupied by a human being whether the occupant is seated normally or leaning; determination of the presence of one or more human beings hidden or hiding within an enclosed space, such as a trailer, a cave, or an underground bunker; location of persons or animals trapped in a hazardous or hostile environment; and determination of the drowsiness of a human engaged in a dangerous task, such as the operation of an automobile or truck.

2. Discussion of the Related Art

In order that a front-seat passenger in a vehicle be protected in the event of a collision, motor vehicles are equipped with a front-seat passenger airbag. A necessary, but not entirely sufficient, condition for airbag deployment is that the front passenger seat be occupied. There are a number of systems for determining the presence of a human being in a vehicle seat. A typical detection system available in the art includes one or more sensing devices for measuring predetermined characteristics of a seat occupant. The sensed characteristics are used to determine whether a vehicle seat is occupied with a human subject, and further to determine whether to deploy the airbag. The weight of the occupant has been used in known arrangements as a fundamental parameter in this regard. More particularly, weight is used as a criterion to distinguish between a human-occupied seat and an empty seat. However, weight-based occupant detection systems have met challenges in calibration for different seat types, different operating environments, etc. There also are known systems for detecting occupancy of vehicle seats in which vision, infrared, or ultrasonic focal plane array sensors are used to gather occupant information. These sensors are mounted within the vehicle, but away from the seats, such as in the overhead console. However, since these sensors do not directly measure physical attributes they are not as reliable as those that do, and accordingly, occupant-sensing systems based on such sensors are more prone to errors than their weight-based counterparts. Occupant-sensing systems that use focal plane array technology also tend to be much more costly.

In another application of human being detection systems, unauthorized persons might endeavor to pass through entry checkpoints that have high security requirements (e.g., at airports, shipyards, border crossings, ballparks, concert halls, and secure or limited access areas such as military bases, power plants, nuclear plants, government buildings, etc.) by hiding, for example, in the trunk of an automobile or in a trailer. Conventional visual security checks are time-consuming and prone to fault due to human error and fatigue. An automatic human being presence detection system can reduce the workload for the guards and provide information about the inside of an enclosed space. An enclosed-space human being detection system developed at Lockheed Martin Energy Systems, Inc. detects the presence of human beings with geophones placed on the vehicle and employs wavelet analysis to the sensed data to determine if there are persons in the vehicle. This known system, as is the case with others, is capable of detecting human being presence, but it needs careful positioning and tuning of the sensors.

Enclosed spaces not only include boxed areas, but also areas that are hemispherical, tubular, etc. Examples of the other kind include caves, underground bunkers, tunnels, etc. A case in point is the ongoing anti-terrorism search for hidden/hiding criminals over the countryside and mountain ranges of certain foreign countries. The system proposed herein is useful in locating and capturing human beings who are hidden or hiding in caves, underground bunkers, tunnels, etc.

There is a need for a human being presence detection system that locates human beings buried under rubbles, trapped behind barriers, or inside buildings. After a disaster strikes, such as an earthquake, a hurricane, or a terrorist attack, human beings might be buried or trapped under rubble or behind large barriers. Similarly, there is a need to find human beings trapped indoors during a building fire. Rapid location of such persons can reduce the loss of life.

In a "life-detection system," human subjects are illuminated by penetrating microwave, and the reflected wave is modulated by the body movements, including the breathing and heartbeat. In this arrangement, the human being presence detection is accomplished by extracting the breathing and heartbeat component signals from the received microwave signal.

Drowsiness is a common attribute of humans engaged in repetitive monotonous tasks. When the task is, for example, the operation of an automobile or truck, the consequences of undetected drowsiness can be fatal. Previous approaches to the detection of drowsiness have relied on measuring eye closure, i.e., so-called "perclose." Although perclose can be a reliable measure of human drowsiness, it cannot be reliably estimated in operating conditions and requires very careful calibration for each human.

Heartbeat and breathing signals have been extensively used in detecting and monitoring human beings. In one known arrangement the author proposed a hand-held acoustic sensor pad that is placed on the subjects' upper chest to monitor heartbeat and breathing patterns. Since the water-filled sensor is excellently coupled with the human body, it is able to collect high signal-to-noise ratio heartbeat and breath signals. In another known arrangement, the life detection system utilizes active microwave sensors to acquire the heartbeat and breathing signals with a high signal-to-noise ratio. In both these cases, the acquired signal clearly shows the breathing and heartbeat patterns in time domain.

SUMMARY OF THE INVENTION

To detect the presence of human subjects without intruding on their privacy or without being able to access them directly, the sensors of the detection system should be able to take advantage by remote operation of some reliable featured movement of the human body or its parts. The heartbeat signal inside the human body can propagate to the body surface and then generate a shock wave around the body. This wave can be used as evidence of the presence of a human being. Each time the heart beats it generates a small measurable shock wave, ballistocardiogram, that propagates through the body. This wave can be measured either with a sensor that is directly in contact with the human body or with a sensor that is not in direct contact with the body but which has a receiver that is appropriately positioned and oriented. Human breathing is similarly detectable. Pressure transducers are the sensors of choice for measuring such human heartbeat and breathing signals. Such pressure transducers include, for example, strain gauges, load cells, accelerometers, geophones, laser vibrometers, fiber-optic probes, microwave radiometers, etc.

In the applications of the present invention, the heartbeat and breathing signals are very weak compared to the ambient noise and therefore cannot be detected by examining the time domain signal alone. To overcome the extremely low signal-to-noise ratio ubiquitous to the application under discussion, a novel non-linear short-term frequency-selective energy distribution method is used to detect the presence of heartbeat and breathing signals embedded in the measured data. This novel method has the ability to detect weak heartbeat and breathing signals in a variety of different noises, e.g., wind, suspension rocking, road, etc.

The human being presence detection system accepts data from pressure transducers located in an area of interest. A novel short-term non-linear frequency-selective energy distribution method is applied to detect the existence of heartbeat and breathing signals in the measured data. This method, in conjunction with measurement transducers, forms a system for detecting the presence and absence of human beings in any reasonably enclosed space.

In one embodiment of the invention, the human being presence detection system distinguishes between human being-occupied and empty vehicle seats, and as such can be integrated into a driver/passenger restraint (seat-belt) and protection (airbag) system.

In another illustrative embodiment of the invention, the human being presence detection system determines the presence of human subjects in an enclosed space, such as a trailer, a vehicle trunk, etc. This detection capability is useful for entry point security screening purposes.

In yet another illustrative embodiment of the invention, the human being presence detection system locates and facilitates the rescue of human beings trapped under rubble, behind barriers, inside buildings, etc. With appropriately chosen and positioned pressure transducers, the human heartbeat and breathing signal will be recorded, and with the non-linear short-term frequency-selective energy distribution method disclosed herein, the presence of human beings is detected.

In yet another exemplary embodiment of the invention, the human presence detection system can be used to detect human drowsiness/fatigue. This detection capability can be used to prevent accidents and loss of life when the human is engaged in dangerous activity such as driving an automobile or truck.

In a further illustrative embodiment of the invention, the human being presence detection system identifies whether a human vehicle seat occupant is properly seated—in-position (appropriately away from the airbag) or out-of-position (too close to the airbag).

Some of the distinguishing features of the human being presence detection system in accordance with the invention disclosed herein are its:

1. use of existing pressure transducer data in detecting human being presence in a vehicle seat;
2. distinguishing between a human being-occupied and an empty vehicle seat without requiring externally mounted focal plane array sensors, such as vision, infrared, ultrasonic sensors, etc.;
3. avoidance of the need for calibration and the ambiguity associated with weight-based seat occupancy detection systems;
4. real time inspection of an enclosed space;
5. utility in locating and facilitation of the rescue of trapped human beings in spaces that are difficult for human access such as debris/rubble, large barriers, burning buildings, etc.;
6. utility in locating and facilitation of the capture of human beings hidden/hiding in enclosed spaces such as caves, underground bunkers, tunnels, etc.;
7. ability to detect drowsiness and fatigue in humans engaged in monotonous or tedious tasks, and
8. robust non-linear short-term frequency-selective energy distribution analysis and appearance-recognition methodologies for weak signal, large noise, and varying operating conditions.

BRIEF DESCRIPTION OF THE DRAWINGS

Comprehension of the invention is facilitated by reading the following detailed description in conjunction with the annexed drawings, in which.

DETAILED DESCRIPTION

1. Data Acquisition

Figure 1A:
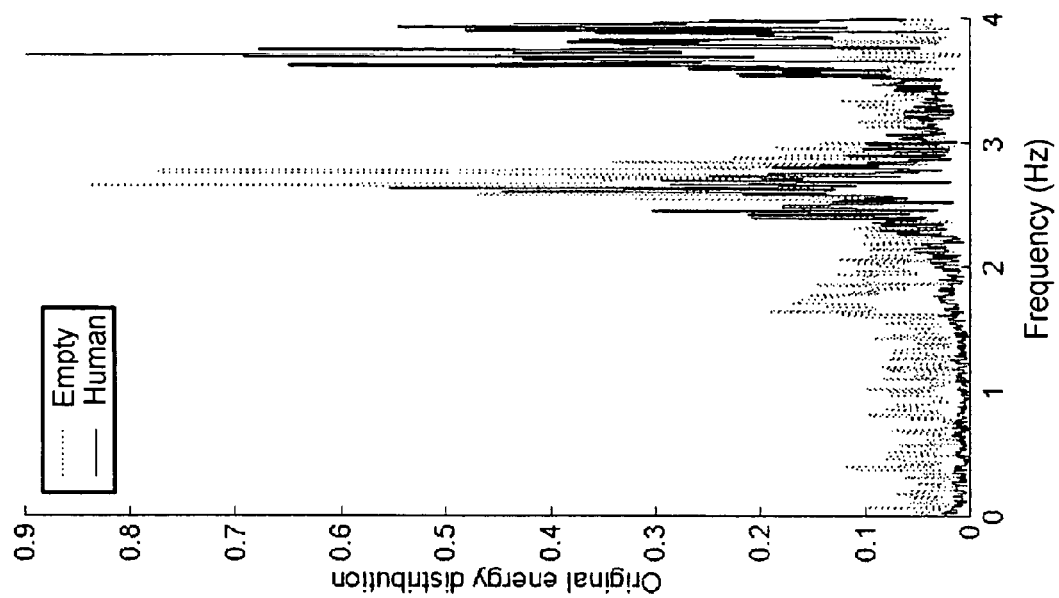
FIGS. 1a and 1b are graphical representations that illustrate the energy distribution across various frequencies of human-being-present and empty signals in a vehicle seat occupancy detection application.

Each time the heart beats the ballistocardiogram propagates through the human body, through the media between the human body and the measurement transducer, and is eventually recorded by the transducer. The same is true of the human breathing signal. The media between the human body and the measurement transducer vary tremendously across the different applications Such media often includes the seat cover, cushion, and seat frame combination in vehicle seat occupancy detection applications; the vehicle body that encloses the trailer or the trunk space in entry point inspection applications; the rubble surface or the glass pane window in search and rescue applications; or the earth or the outer wall in search and capture applications. Since ballistocardiogram and breathing signals propagate in these media with different attenuations, the selection of the transducers that measure these signals is application dependent. For example, the vehicle seat occupancy application uses a load cell, accelerometers, strain gauges, etc.; the entry point security screening application uses geophones, acoustic pads, etc.; the locate and rescue or capture applications use geophones, fiber-optic probes, laser vibrometers, microwave radiometers etc. No matter which transducer is used, they all produce at their respective outputs a real-valued signal sequence data over time. The data is subsequently processed by the human being presence detection system.

2. Human Being Presence Detection Algorithm

The nature of the data recorded will vary considerably across the gamut of pressure transducers. In particular, the strength of the heartbeat and breathing signals will depend on the location/proximity of the human being, the media between the human being and the transducer, the sensitivity of the transducer, and its frequency response. The environments in which these transducers operate could introduce a variety of noise signals of varying strengths and energy distributions. However, all such measured data do provide information about the presence of human beings, and the redundant and complementary nature of these transducers allows us to improve the accuracy and reliability of human being presence detection with data fusion techniques.

There are several categories of data fusion methods based on the stage at which the fusion is performed, namely, signal-based, feature-based and decision-based. Since the sensors in the present detection setting are conditionally independent in their sensing capability, decision-based fusion is the method of choice. In decision-based fusion, each sensor makes a separate detection decision. These decisions are then combined using voting techniques, as described hereinbelow:

Let $x_i([n]t_{s_i})$ denote the signal obtained with the $i^{th}$ sensor at sampling time instant $nt_{s_i}$ where $i=1, 2, \ldots, I$, and $I$ is the total number of sensors. At any sampling instant $n_0$, a decision regarding the presence/absence of human beings will be made based on the previous $N_i$ signal samples received:

$$\bar{x}_i(n_0) = [x_i([n_0-N_i+1]t_{s_i}), x_i([n_0-N_i+2]t_{s_i}), \ldots, x_i([n_0]t_{s_i})]^T.$$

Where $N_i$ is determined by the sampling rate $t_{s_i}$ of the $i^{th}$ signal, with the assumption that the energy distribution of $N_i$ continuous samples of the measured signal $x_i([n]t_{s_i})$ will provide enough information about the existence of heartbeat and breathing in $\bar{x}_i(n_0)$.

Figure 1B:
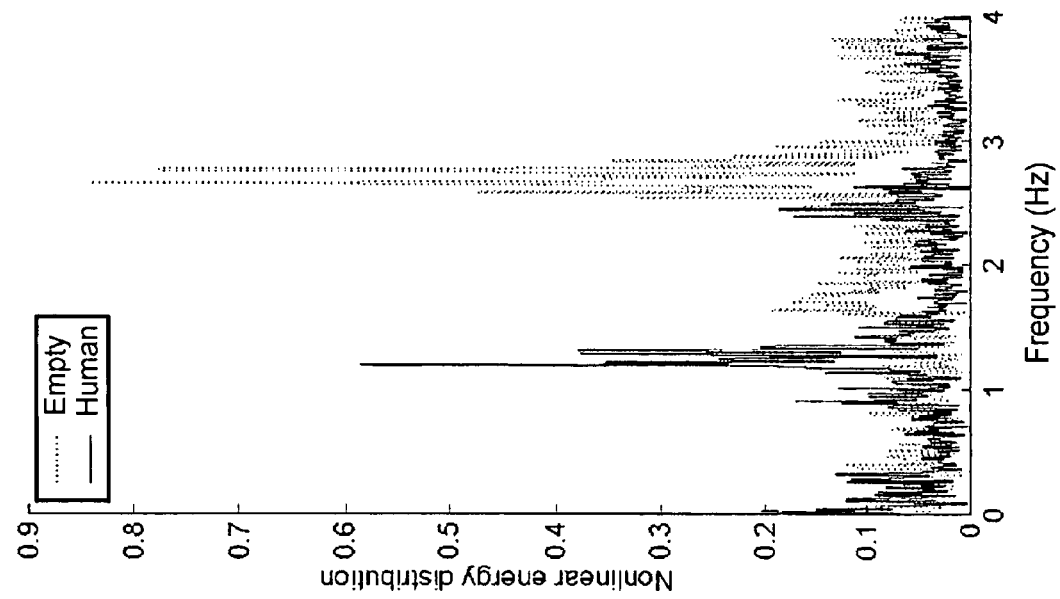
Figure 2A:
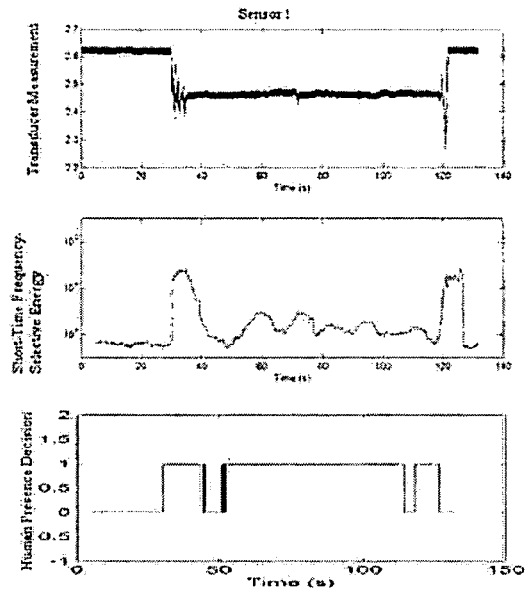
FIGS. 2a, 2b, 2c, and 2d are graphical representations that illustrate the signal data obtained from four pressure transducers (sensors 1–4, respectively), illustratively in the form of load cells, their corresponding short-time frequency-selective energy distribution, and an individual human being presence/absence decision.
Figure 2B:
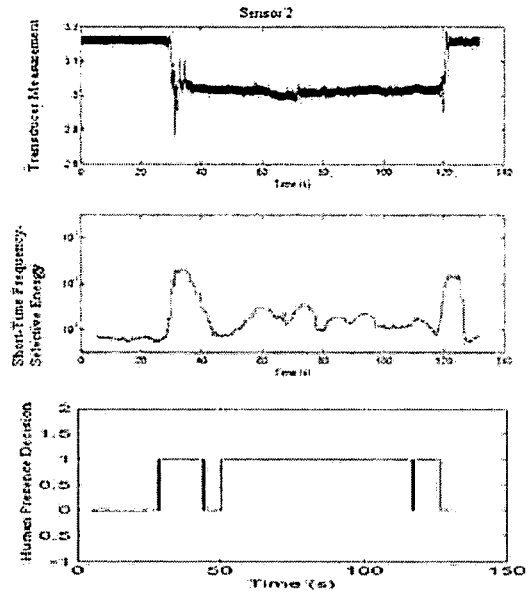
Figure 2C:
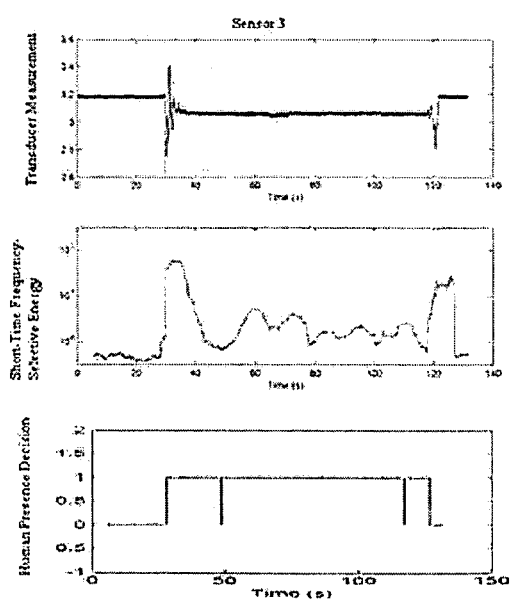
Figure 2D:
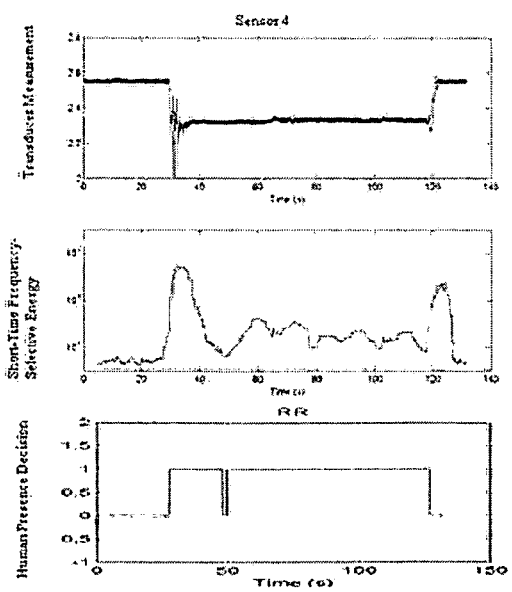

The $N_i$-point non-linear discrete Fourier transform of the signal $\bar{x}_i(n_0)$ is given by:

$$X_{n_0}^i(k) = \frac{1}{\sqrt{N_i}} \sum_{n=n_0-N_i+1}^{n_0} f[x_i(n)] e^{-j\frac{2\pi(n-n_0+N_i-1)k}{N_i}}, k = 0, 1, 2, \cdots, N_i - 1$$

Where f[.] denotes the mean-subtraction operation, followed by a non-linear operation such as the absolute value of the mean subtracted signal. FIG. 1a illustrates the energy distribution across various frequencies when there's human present versus empty. It is obvious that the signal containing a heartbeat concentrates its energy in select frequencies in the 1–2 Hz frequency range. In this application, it turns out that noise signals—wind, suspension rocking, road, etc.— result in a signal components of very low frequency, mostly under 1 Hz or over 2 Hz. To be immune of such low frequency noise, the human presence detection algorithm will focus on the frequency range from 0 to 4 Hz. For comparison, FIG. 1b illustrates the energy distribution of the original signal over the same band of frequencies. The effectiveness of the non-linear operation is clear.

Let $\Gamma$ denote the select frequencies over which the human heartbeat and breathing signals have sufficient/discernible energies. The non-linear normalized energy distribution of $\bar{x}_i(n_0)$ over these select frequencies $\Gamma$ of is given by $X_{n_0}^i = \{\|X_{n_0}^i(k)\|^2, k \in \Gamma\}$. If $\Gamma$ is selected carefully, the short-term frequency-selective energy of the measured signal is a good discriminant between the presence and absence of human heartbeat and breathing signals in the measurement.

As an example, let $$e_i(n_0 t_{s_i}) = \frac{1}{|\Gamma|} \sum_{k \in \Gamma} \|X_{n_0}^i(k)\|^2,$$

We call $e_i(n_0 t_{s_i})$ non-linear short-term frequency-selective energy of the measured signal at time instant $n_0 t_{s_i}$. An appropriate threshold $E_i$ can be used to determine the presence of a human, i.e., if $e_i(n_0 t_{s_i}) > E_i$, then $d_i(n_0 t_{s_i}) = 1$, which means that the presence of human is detected; otherwise, $d_i(n_0 t_{s_i}) = 0$, which means that no human is detected in the transducer measurement.

When the above individual sensor detection algorithm is applied to measurement data obtained from all the fielded sensors, at any instant in time I independent decisions are available. To make the most of all the sensor measurements, a decision-based data fusion approach is employed. A voting technique is employed to integrate the individual decisions. A variety of voting techniques are available:

At least one $\sum_{i=1}^{I} d_i(n_0 t_{s_i}) \geq 1,$

Majority $\sum_{i=1}^{I} d_i(n_0 t_{s_i}) \geq I/2,$

All $\sum_{i=1}^{I} d_i(n_0 t_{s_i}) = I,$ etc.

3. Human Being Presence Detection Results

The human being presence detection algorithm described above has been applied to the vehicle seat occupancy detection application. FIG. 2 shows the signal data from the four pressure transducers (load cells), their corresponding short-time frequency-selective energy distribution, and the individual human being presence/absence decision. The composite decision obtained by fusing all four individual decisions is shown in FIG. 3. As a comparison, the weight of the occupant calculated from the load sensors is provided. It can be seen that the detection result matches well with the weight calculation. FIG. 4 provides a more general result of human being presence detection using the invention disclosure herein. A single pressure transducer is used to record measurements of the human heartbeat and breathing signal when the human being enters and exits an area of interest and also when a human being-like dummy is placed instead of the human being. Notice that the time domain signal offers virtually no discrimination between the various situations, whereas the short-time frequency-selective energy offers an excellent discrimination.

4. Occupant Pose Classification Algorithm

Once a human being is determined to be present in the enclosed space of interest, other characteristic of the human being are also of interest. For example, in the vehicle seat occupancy application, once it has been determined that the seat is occupied by a human being, whether the occupant is normally seated or leaning is also of interest. It is envisioned that if the occupant is normally seated then the airbag will be deployed with full force, whereas if the occupant is leaning the airbag will be deployed with lower power or not at all.

Categorization of the detected human being is also done using the short-time measured signal $\bar{x}_i(n_0)$. Details follow:

4.1 Database, Dimensionality Reduction, and Signal Representation

Let $\bar{y}(n_0) = [\bar{X}_{n_0}^1, \bar{X}_n^2, \ldots, \bar{X}_{n_0}^I]$. For simplicity and clarity of further description, we will not specify time $n_0$ where no ambiguity rises, i.e., $\bar{y} = [\bar{X}^1, \bar{X}^2, \ldots, \bar{X}^I]$. A training set T consists of samples of $\bar{y}$ for the various human being categories. Let $m_1, m_2, \ldots, m_c$, represent the number of samples of $\bar{y}$ in each of the c human being categories, $T_1, T_2, \ldots, T_c$ denote the partition of the training samples into c categories (i.e., $T = T_1 \cup T_2 \ldots \cup T_c$), and M denote the total number of samples in T. Let t represent the corresponding human being category for each training sample $\bar{y}$.

Using a Fisherbasis algorithm, we compute a projection matrix P to project the training samples T onto a much lower dimensional space $\Re^c$. Computation of the projection matrix involves $\bar{\mu}_i = \Sigma_{\bar{y}_j \in T_i} \bar{y}_j / m_i$, $i = 1, 2, \ldots c$, $S_W = \Sigma_{i=1}^c \Sigma_{\bar{y}_k \in T_i} (\bar{y}_k - \bar{\mu}_i)(\bar{y}_k - \bar{\mu}_i)^T$, and $S_B = \Sigma_{i=1}^c m_i(\bar{\mu}_i - \bar{y}_{avg})(\bar{\mu}_i - \bar{y}_{avg})$ where $\bar{y}_{avg} = \Sigma_{j=1}^M \bar{y}_j / M$ is the average signal vector. The projection matrix P is chosen so that $(PS_W P^T)^{-1}(PS_B P^T)$ is maximized. This amounts to computing the eigenvectors of the matrix $S_W^{-1} S_B$ which is a large N×N matrix (where N denotes the length of $\bar{y}$) whose eigenvectors are not easily determined. An alternate strategy for computing of P is pursued.

Let $Z = [\bar{y}_i - \bar{y}_{avg}, i = 1, 2, \ldots M]$ be an N×M dimensional matrix of zero mean short-time measurements. The covariance matrix of Z is then given by $C = ZZ^T$, a N×N matrix. The alternate strategy for computing P involves finding the eigenvectors of C. In reality, since M<<N, the eigenvectors of the M×M matrix $Z^T Z$ is found. The non-zero eigenvectors $e_1, e_2, \ldots, e_M$ of the covariance matrix C are then computed as $Z \cdot eig(Z^T Z)$. The vectors $e_1, e_2, \ldots, e_M$ are typically called eigenbases, which are unit norm and sorted in the order of decreasing eigenvalues. If $P_E = [e_1, e_2, \ldots, e_{M-2}]$ is the matrix of eigenbases corresponding to the M−2 largest eigenvalues, then the matrices $\bar{S}_W = P_E^T S_W P_E$ and $\bar{S}_B = P_E^T S_B P_E$ are effective measures of $S_W$ and $S_B$ in the eigenspace. Finally, the Fisher projection matrix P is computed as $P = eig(\bar{S}_W^{-1} \bar{S}_B)$.

Once the projection matrix P is computed, each of the training signals $\bar{y}_j$ can be projected onto a lower-dimensional vector as follows: $\bar{p}_j = P^T \bar{y}_j$.

4.2 Classification

Given the non-linear energy spectrum measurement signal $\bar{y}$, with human presence, it is first projected onto a lower-dimensional space using $P - \bar{p} = P^T \bar{y}$. The human category of $\bar{y}$ is decided by a nearest-neighbor classification of the low-dimensional vector $\bar{p}$.

FIGS. 1a and 1b are graphical representations that illustrate the energy distribution across various frequencies of human-being-present and empty signals in a vehicle seat occupancy detection application. FIG. 1a illustrates the energy distribution using the preferred nonlinear energy distribution methodology of the present invention, and FIG. 1b illustrates the original energy distribution. It is evident that the distinction between an empty environment (dotted graph) and the same environment occupied by a human (continuous line graph) is significantly more evident in the nonlinear energy distribution analysis.

FIGS. 2a, 2b, 2c, and 2d are graphical representations that illustrate the signal data obtained from four pressure transducers (sensors 1–4, respectively), illustratively in the form of load cells, their corresponding short-time frequency-selective energy distribution, and an individual human being presence/absence decision.

Figure 3A:
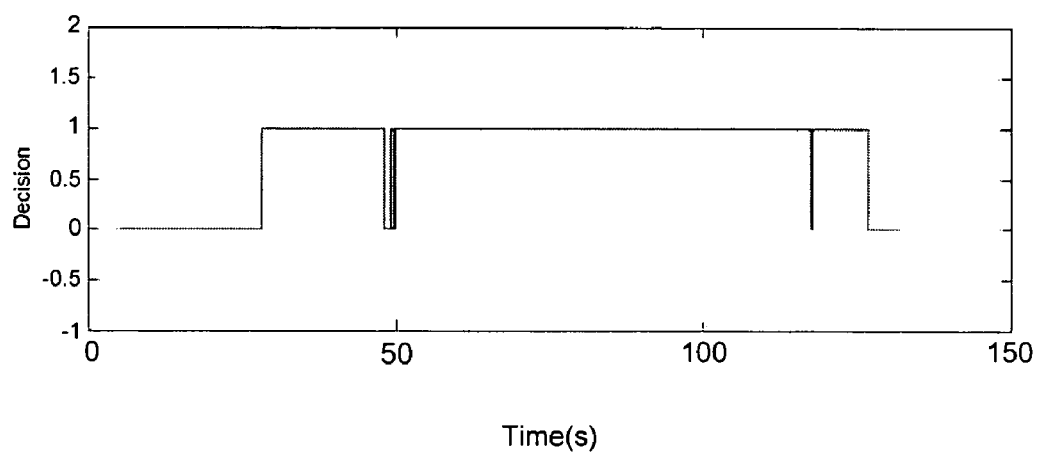
FIGS. 3a and 3b are graphical representations that illustrate the composite decision obtained by fusing all four individual decisions.
Figure 3B:
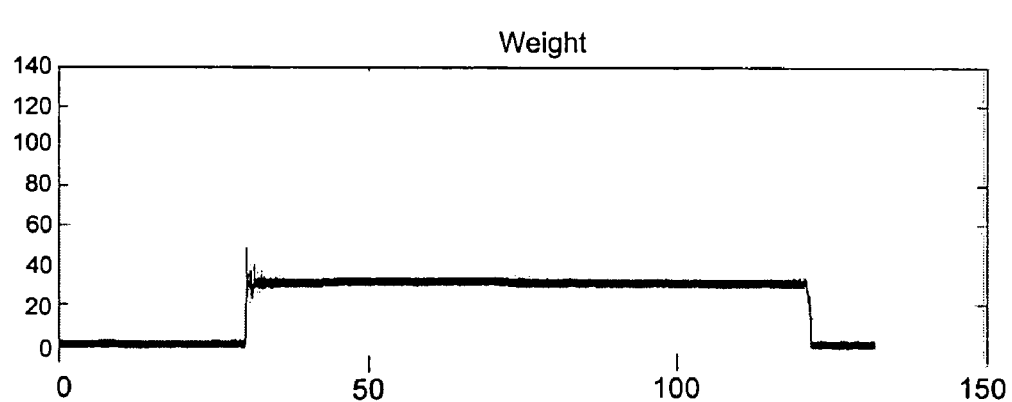

FIGS. 3a and 3b are graphical representations that illustrate the composite decision obtained by fusing all four individual decisions determined in FIGS. 2a, 2b, 2c, and 2d. As shown, using the nonlinear energy distribution analysis of the present invention results in a consistent unequivocal determination of presence decision making using all four transducers.

Figure 4A:
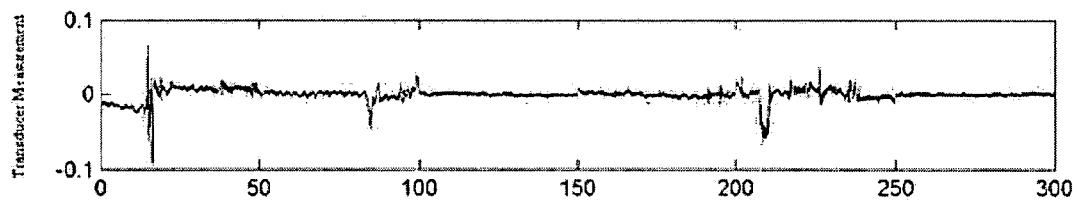
FIGS. 4a, 4b, 4c, and 4d are graphical representations that illustrate a general result of human being presence detection in accordance with the invention.
Figure 4B:
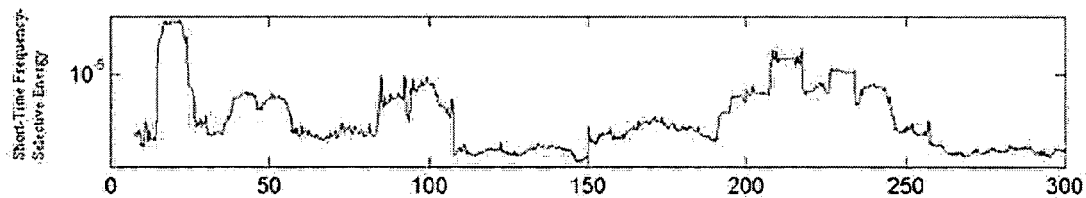
Figure 4C:
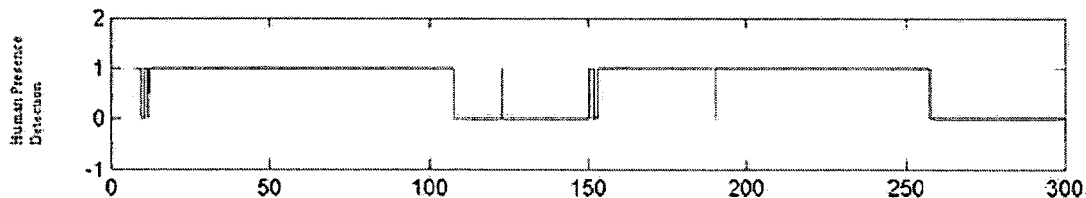
Figure 4D:
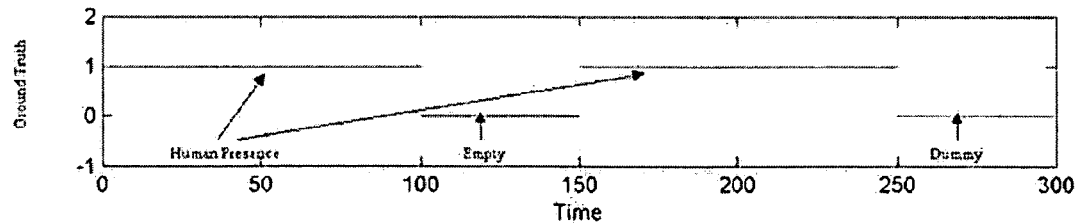

FIGS. 4a, 4b, 4c, and 4d are graphical representations that illustrate a general result of human being presence detection in accordance with the invention. FIG. 4d is useful to illustrate that the human presence detection of FIG. 4c corresponds to the ground truth represented in FIG. 4d.

Figure 5:
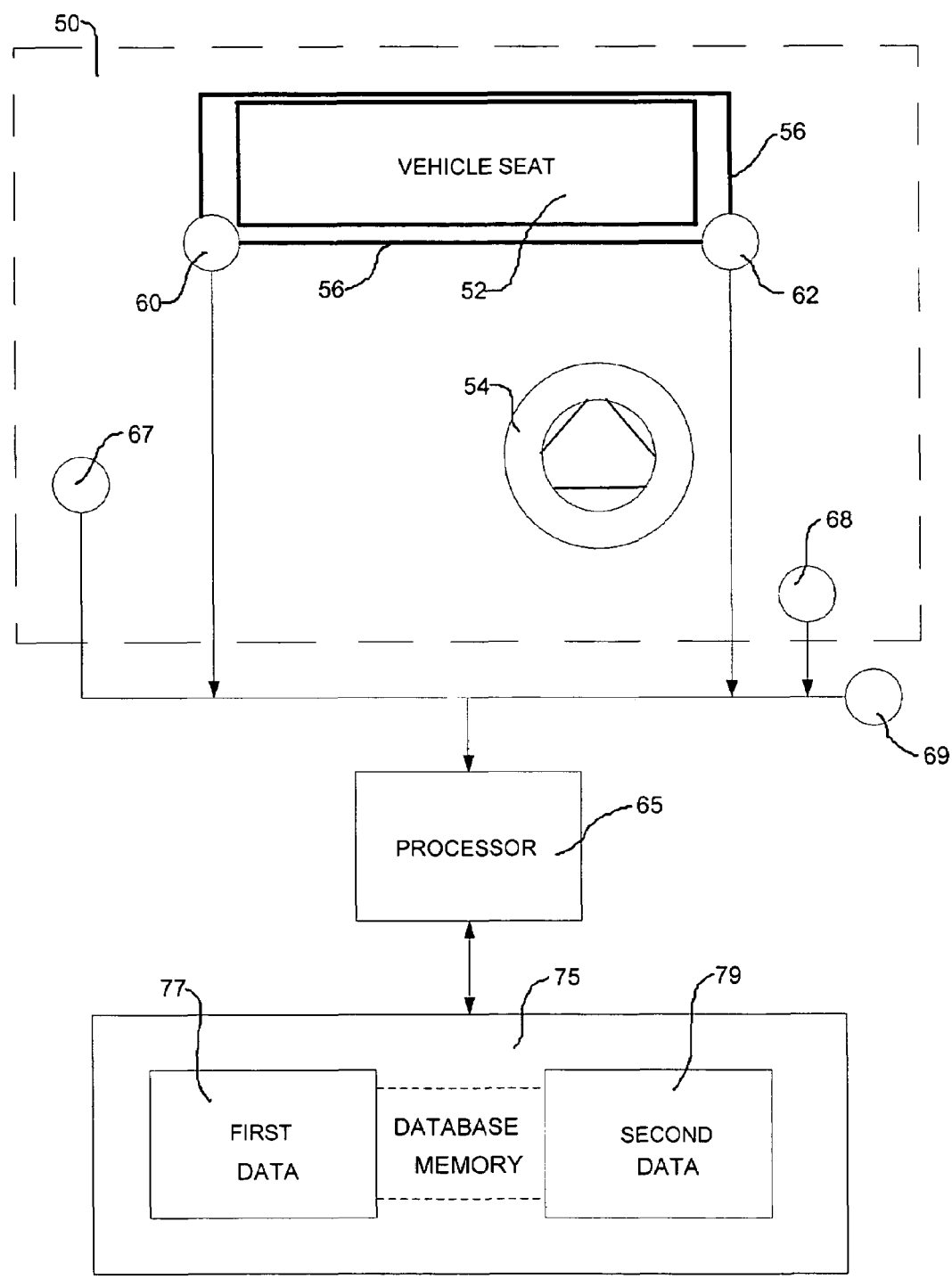
FIG. 5 is a simplified schematic illustration of a specific illustrative arrangement of certain structural elements arranged in accordance with the principles of the invention.

FIG. 5 is a simplified schematic illustration of a specific illustrative arrangement of certain structural elements arranged in accordance with the principles of the invention. As shown in this figure, a predetermined space in the form of a vehicle interior 50, within the dashed line in the figure, has a vehicle seat 52 therein, as well as a conventional steering wheel 54. There are provided on a seat frame 56 a pair of pressure transducers 60 and 62 that produce respective transducer signals responsive to the pressure applied to vehicle seat 52. The transducer signals are propagated to a processor 65 that computes one or more algorithms, as hereinabove described.

In accordance with the invention, there are additionally provided further transducers 67 and 68 within vehicle interior 50. An exterior transducer 69 is also shown in the figure to be provided. Transducers 67, 68, and 69 produce signals responsive to the location and movement of a person (not shown) on the vehicle seat, all of which signals being propagated to processor 65.

As stated, processor 65 employs data from a database memory 75 to compute, in some embodiments, an indication of the presence or absence of a human being on the vehicle seat. In other embodiments, the data from database memory 75 is used to identify certain behavioral characteristics of the human being, such as the level of alertness. Generally, the processor will make a determination between binary conditions, such as present or not present, or alert or not alert. Thus, the database memory will generally contain at least two memory regions 77 and 79 that contain data that would correspond to the two conditions being determined by the processor. For example, in an embodiment of the invention where the presence of a human being on the vehicle seat is to be determined, the first data would correspond to data representative of the human present condition, and the second data would correspond to data representative of the human absent condition.

Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclo-

What is claimed is:

1. A system for detecting the presence of a human being within a space of interest, the system comprising:
   a plurality of pressure transducers each for producing an associated transducer signal representative of a pressure wave impinging thereon generated by a human being within the space of interest;
   a database for storing first data corresponding to first recorded pressure signals that represent the presence of a human being and second data corresponding to second recorded pressure signals that represent the absence of a human being; and
   a processor for calculating an algorithm corresponding to a human being presence estimator for each of the transducer signals, a comparison of said human being presence estimator to a trained threshold, and a combination of the detection results from all the said plurality of pressure transducers to determine the presence of a human being in the space of interest.

2. A system for detecting the occupancy of a vehicle seat by a human being, the vehicle seat being of the type having a seat frame, the system comprising:
   a plurality of pressure transducers attached to the seat frame at respective positions thereon each for producing a pressure signal responsive to a pressure applied to the seat frame;
   a database for storing first data corresponding to first recorded pressure signals that represent the presence of a human being sitting on the vehicle seat and second data corresponding to second recorded pressure signals that represent the absence of a human being;
   a processor for calculating an algorithm corresponding to a non-linear short-term frequency-selective energy distribution of the pressure signals from the pressure transducers over time, and comparing the energies of the pressure signals energy to the energies represented in the first and second data stored in the database, and
   an arrangement for determining a threshold of similarity for distinguishing a human-being-occupied vehicle seat from an empty vehicle seat.

3. The system of claim 2, wherein one of said pressure transducers is a load cell.

4. The system of claim 2, wherein one of said pressure transducers is an accelerometer.

5. The system of claim 2, wherein the second data corresponding to second recorded pressure signals that represent the absence of a human being correspond to and empty vehicle seat.

6. A system for detecting the presence of a human subject in a predetermined space of interest, comprising:
   a plurality of pressure transducers placed in predetermined spatial relationship to the space of interest, a database containing recorded pressure signals that correspond to a human subject being present and empty space,
   a processor for calculating an algorithm corresponding to the non-linear short-term frequency-selective energy distribution of the measured signals from the pressure transducers over time, and for comparing the measured signal's energy to those in the database, and
   an arrangement for determining the threshold of similarity for distinguishing the human-being-occupied space from the empty space.

7. The system of claim 6, wherein one of said plurality of pressure transducers is a load cell.

8. The system of claim 6, wherein one of said plurality of pressure transducers is an accelerometer.

9. The system of claim 6, wherein one of said plurality of pressure transducers is a geophone.

10. The system of claim 6, wherein one of said plurality of pressure transducers is a microwave radiometer.

11. The system of claim 6, wherein one of said plurality of pressure transducers is disposed in the vicinity of the predetermined space of interest.

12. The system of claim 6, wherein one of said plurality of pressure transducers is disposed within the predetermined space of interest.

13. A system for detecting the presence of a human subject trapped under rubble or behind barriers or within a burning building, the system comprising:
   a plurality of pressure transducers placed in predetermined relation to the rubble or barrier, the pressure transducers being appropriately oriented,
   a database containing recorded pressure signals that correspond to a human being present and to empty space,
   a processor for calculating an algorithm corresponding to the non-linear short-term frequency-selective energy distribution of the measured signals from the pressure transducers over time, and for comparing the measured signal's energy to those in the database, and
   an arrangement for determining the threshold of similarity for distinguishing the human-being-occupied space from the empty space.

14. The system of claim 13, wherein one of said plurality of pressure transducers is a geophone.

15. The system of claim 13, wherein one of said plurality of pressure transducers is a microwave radiometer.

16. A system for determining whether a human occupant in a vehicle seat is in a fatigued condition or in an alert condition, the system comprising:
   a plurality of pressure transducers for recording the human heartbeat from respective positions;
   a database containing data corresponding yo recorded pressure signals that correspond to alert and fatigued human conditions;
   an algorithm for calculating a non-linear short-term frequency-selective energy distribution of the recorded signals from the pressure transducers over time, and for determining the instantaneous heartbeat of the human occupant; and
   an arrangement for determining a threshold of similarity for distinguishing between alert and fatigued conditions of the human occupant.

17. The system of claim 16, wherein one of said plurality of pressure transducers is a load cell.

18. The system of claim 16, wherein one of said plurality of pressure transducers is an accelerometer.

19. A system for determining whether a human occupant in a vehicle seat is in position or out of position, the system comprising:
   a database containing recorded pressure signals that correspond to vehicle occupants that are normally seated and to vehicle occupants that are leaning;
   a linear subspace representation of the database that reduces the dimensionality of each signal from more than 100 to approximately 1 using the Fisherbasis methodology;

a representation of any newly measured pressure signal using the Fisherbasis methodology; and a classification of the newly measured pressure signal into an in position class or an out of position class, upon determining that the vehicle seat is occupied by a human being.

20. The system of claim 19, wherein the in position condition corresponds to the human occupant being normally seated, and the out of position condition corresponds to the human occupant being in a leaning position.

* * * * *